(12) United States Patent
Mills et al.

(10) Patent No.: US 7,198,228 B2
(45) Date of Patent: Apr. 3, 2007

(54) AIRCRAFT CABIN CREW COMPLEX

(75) Inventors: Christopher J. Mills, Everett, WA (US); James R. Park, Everett, WA (US)

(73) Assignee: The Boeing Company, Chicago, IL (US)

(*) Notice: Subject to any disclaimer, the term of this patent is extended or adjusted under 35 U.S.C. 154(b) by 280 days.

(21) Appl. No.: 10/711,386

(22) Filed: Sep. 15, 2004

(65) Prior Publication Data

US 2006/0054741 A1    Mar. 16, 2006

(51) Int. Cl.
B64D 11/00    (2006.01)

(52) U.S. Cl. .................................. 244/118.5

(58) Field of Classification Search ............. 244/118.5, 244/118.6, 117 R
See application file for complete search history.

(56) References Cited

U.S. PATENT DOCUMENTS

| | | | | | |
|---|---|---|---|---|---|
| 2,004,296 | A | * | 6/1935 | Royce | 312/282 |
| 2,761,637 | A | * | 9/1956 | Brumby et al. | 244/118.5 |
| 3,517,899 | A | * | 6/1970 | Vernon | 186/40 |
| 3,558,086 | A | * | 1/1971 | Kraly | 186/40 |
| 3,873,114 | A | * | 3/1975 | Brown | 280/30 |
| 3,877,744 | A | * | 4/1975 | Miller | 296/22 |
| 4,022,404 | A | * | 5/1977 | Greiss | 244/118.5 |
| 4,055,317 | A | * | 10/1977 | Greiss | 244/118.5 |
| 4,076,349 | A | * | 2/1978 | Gettleman et al. | 312/236 |
| 4,361,014 | A | * | 11/1982 | Blain | 62/237 |
| RE32,176 | E | * | 6/1986 | Vernon | 244/118.5 |
| 4,660,787 | A | * | 4/1987 | Sprenger et al. | 244/118.5 |
| 5,074,496 | A | * | 12/1991 | Rezag et al. | 244/118.1 |
| 5,314,143 | A | * | 5/1994 | Luria | 244/118.1 |
| 5,322,244 | A | * | 6/1994 | Dallmann et al. | 244/118.5 |
| 5,413,292 | A | * | 5/1995 | Luria | 244/118.1 |
| 5,474,260 | A | * | 12/1995 | Schwertfeger et al. | 244/118.5 |
| 5,491,979 | A | * | 2/1996 | Kull et al. | 62/185 |
| 5,655,734 | A | * | 8/1997 | Dahl | 244/137.1 |
| 6,007,025 | A | * | 12/1999 | Coughren et al. | 244/118.6 |
| 6,305,643 | B1 | * | 10/2001 | Sankrithi | 244/118.1 |
| 6,340,136 | B1 | * | 1/2002 | Luria | 244/118.1 |
| 6,412,603 | B1 | * | 7/2002 | Nervig et al. | 187/267 |
| 6,454,208 | B1 | * | 9/2002 | Nervig et al. | 244/118.1 |
| 6,464,169 | B1 | * | 10/2002 | Johnson et al. | 244/118.5 |
| 6,474,677 | B2 | * | 11/2002 | Kasuya | 280/639 |
| 6,520,451 | B1 | * | 2/2003 | Moore | 244/118.5 |
| 6,616,098 | B2 | * | 9/2003 | Mills | 244/118.5 |
| 6,761,332 | B1 | * | 7/2004 | Bengtsson | 244/118.5 |
| 6,925,944 | B1 | * | 8/2005 | Miller et al. | 108/115 |
| 6,971,608 | B2 | * | 12/2005 | Harrington et al. | 244/118.5 |
| 7,080,806 | B2 | * | 7/2006 | Mills | 244/118.1 |

(Continued)

*Primary Examiner*—Teri Pham Luu
*Assistant Examiner*—Stephen Holzen
(74) *Attorney, Agent, or Firm*—Ostrager Chong Flaherty & Broitman P.C.

(57) ABSTRACT

A cabin crew area (10) of an aircraft (14) includes an aft area (16) with multiple galley carts (30). The aft area (16) has a fore/aft depth that is approximately equal to the depth of two or more of the galley carts (30). A galley storage unit (32) resides in the aft area (16) and stores the galley carts (30). The galley storage unit (32) is configured for placement of a portion of the galley carts (30) in a lateral row in a forward section (42) of the aft area (16). A main counter (34) resides over the galley storage unit (32) and extends laterally across a galley-servicing area (12) of the aircraft (14).

15 Claims, 3 Drawing Sheets

U.S. PATENT DOCUMENTS

| | | | |
|---|---|---|---|
| 7,083,145 B2* | 8/2006 | Mills .................... | 244/118.5 |
| 2001/0010419 A1* | 8/2001 | Kasuya ................ | 280/33.997 |
| 2001/0050519 A1* | 12/2001 | Kasuya ................ | 312/315 |
| 2003/0029967 A1* | 2/2003 | Mills .................... | 244/118.5 |
| 2003/0042361 A1* | 3/2003 | Simadiris et al. ....... | 244/118.5 |
| 2003/0168281 A1* | 9/2003 | Olliges et al. .......... | 182/97 |
| 2005/0001097 A1* | 1/2005 | Saint-Jalmes ......... | 244/118.6 |
| 2005/0178908 A1* | 8/2005 | Simadiris et al. ....... | 244/118.5 |
| 2005/0178909 A1* | 8/2005 | Mills .................... | 244/118.6 |
| 2006/0054741 A1* | 3/2006 | Mills et al. ............. | 244/118.5 |
| 2006/0065783 A1* | 3/2006 | Mills .................... | 244/118.6 |
| 2006/0113427 A1* | 6/2006 | Saint-Jalmes et al. ... | 244/118.5 |
| 2006/0145002 A1* | 7/2006 | Van Loon ............. | 244/118.1 |

* cited by examiner

US 7,198,228 B2

AIRCRAFT CABIN CREW COMPLEX

TECHNICAL FIELD

The present invention is related generally to crew galley, service, and rest areas of an aircraft, and more particularly to the efficient utilization of the stated areas, as well as other areas of an aircraft.

BACKGROUND OF THE INVENTION

Modern aircraft typically include passenger compartments, galley service, doorways, auxiliary areas, and crew rest areas. The galley areas often include service carts that have beverage and food items, galley service counters, waste carts, storage containers, and various other service related items, such as ovens, coffee pots, and beverage racks. The crew rest areas often include, berths, seated areas, lavatories, and stowage areas. The stated items and areas occupy significant portions of an aircraft.

An aft galley area typically includes a starboard doorway, a port doorway, and multiple galley service counters. An aft galley area often includes a pair of opposing service counters extending longitudinally in fore and aft directions and may also include a lateral counter coupled between the opposing counters and mounted against an aft most interior cabin wall of an aircraft. Galley carts are stored in single rows under the service counters and other service related items, such as those mentioned above, are stored in enclosures located above the counters.

Use of an opposing countertop arrangement can result in interference between crewmembers and galley carts. For example, crewmembers may be prevented from utilizing or removing a galley cart from beneath a starboard counter while a galley cart is removed from beneath a port side counter, due to the obstruction of the narrow area between the opposing counters by that port side cart.

Also, the utility of current aircraft doorway areas is not maximized. It is desirable within an aircraft to use a particular area for multiple purposes since all of the interior aircraft space is valuable. Unlike most other aircraft spaces, current doorway areas tend to be unobstructed, uncongested, left open, and not efficiently utilized. The doorway areas are designed for a single purpose and that is to provide space for the opening of aircraft doors and passage therethrough. Although the spaciousness of the doorway areas allows for the temporary storage of galley carts and provides areas for crewmembers and passengers to stretch, single purpose use thereof is considered inefficient and underutilized.

Thus, there exists a need for an improved galley, crewmember, and doorway area system that provides increased space efficiency and utility.

SUMMARY OF THE INVENTION

One embodiment of the present invention provides a cabin crew area of an aircraft that includes an aft area with multiple galley carts. The aft area has a fore/aft depth that is approximately equal to the depth of two or more of the galley carts. A galley storage unit resides in the aft area and stores the galley carts. The galley storage unit is configured for placement of a portion of the galley carts in a lateral row in a forward section of the aft area. A main counter resides over the galley storage unit and extends laterally across a galley-servicing area of the aircraft.

The embodiments of the present invention provide several advantages. One such advantage is the provision of a single main counter that extends laterally across a galley-servicing area and that resides over a galley cart storage unit. The arrangement of the main counter and galley cart storage unit minimizes crewmember or galley cart interference while performing galley-servicing tasks.

Another advantage provided by an embodiment of the present invention, is the provision of a galley area that has a single lateral counter and utilizes adjacent or nearby doorway areas for performing galley-servicing tasks. In so doing, a significant volume or space is provided aft of a lateral row of service carts. This space can be utilized for a number of functions such as stowage of galley carts and stowage carts, as well as incorporation of crew rest areas and line replaceable units (LRUs).

Yet another advantage provided by an embodiment of the present invention, is the provision of an aft area that has a double deep galley cart storage structure, which allows for increased galley cart storage. The double deep galley cart storage structure provides three separate advantages. The first advantage is the ability to centralize cart stowage to a single location on an airplane, thus allowing main deck space normally used for carts to be used for other purposes such as passenger seats. The second advantage is increased over counter storage. The third advantage is increased counter working surface area.

Still another advantage provided by an embodiment of the present invention, is the provision of an aft area of a galley or cabin crew area of an aircraft that has a lateral extending counter with a lateral row of galley carts stored therebelow in addition to a crew rest area residing between the lateral extending counter and an aft wall of an aircraft.

Additionally, another advantage provided by an embodiment of the present invention, is the provision of a lateral extending counter with a lateral row of galley carts stored therebelow in addition to a lavatory residing between the counter and a side exterior wall of the aircraft and between the galley carts and the side exterior wall.

As well, another advantage provided by an embodiment of the present invention, is the provision of counter sections that extend across a doorway area of an aircraft for galley service task performance thereon.

Furthermore, the above stated advantages provide increased utility and space efficiency of crew cabin and doorway areas of an aircraft.

The present invention itself, together with further objects and attendant advantages, will be best understood by reference to the following detailed description, taken in conjunction with the accompanying drawing.

DETAILED DESCRIPTION

Figure 1A:
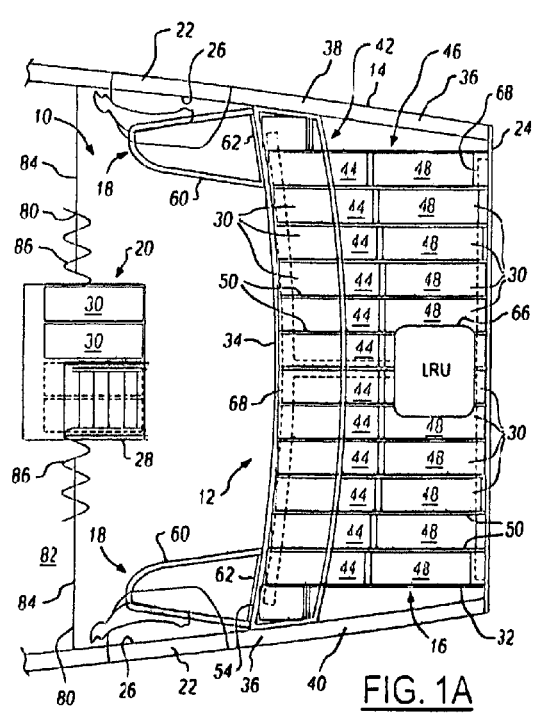
FIG. 1A is a top view of a cabin crew area of an aircraft in accordance with an embodiment of the present invention.

In the following Figures the same reference numerals will be used to refer to the same components. While the present invention is described primarily with respect to cabin crew areas and the arrangements thereof, the present invention may be adapted and applied in various applications. The present invention may be applied in aeronautical applications, nautical applications, railway applications, automotive vehicle applications, and commercial and residential applications. The present invention may also be applied to various areas of an aircraft including crewmember and non-crewmember areas.

In the following description, various operating parameters and components are described for one constructed embodiment. These specific parameters and components are included as examples and are not meant to be limiting.

Figure 1B:
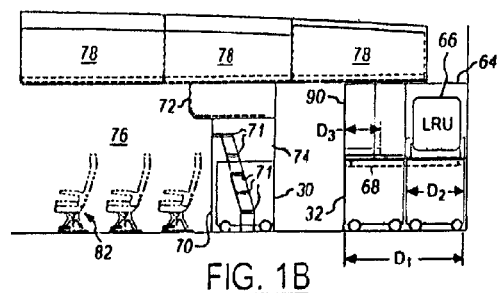
FIG. 1B is a side view of the cabin crew area of FIG. 1A.
Figure 1C:
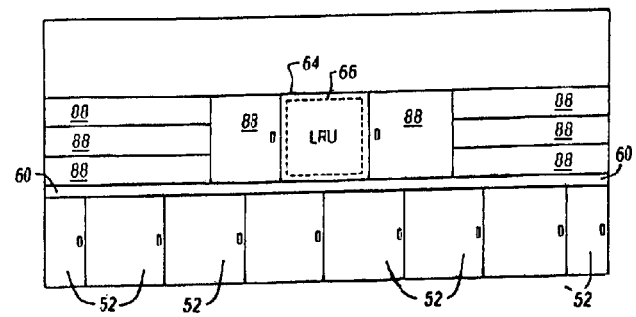
FIG. 1C is a front view of a galley-servicing area of the cabin crew area of FIG. 1A.

Referring now to FIGS. 1A–C, top and side views of a cabin crew system or area 10 and a front view of a galley-servicing area 12 of an aircraft 14 in accordance with an embodiment of the present invention are shown. The cabin crew area 10, in the example embodiment as shown, includes an aft area 16, a pair of doorway areas 18, and a stairway/storage area 20. The aft area 16 is defined as an area aft of one or more rear exterior doors 22 of the aircraft 14 and forward of an aft wall 24 of the aircraft 14. The doorway areas 18 are defined as areas in front of interior sides 26 of the doors 22 and include the doors 22. The doors 22 allow for the ingress and egress of passengers and crewmembers into and out of the aircraft 14. The stairway/storage area 20 is defined as an area that includes a stairway 28 and provides storage for passenger and/or crewmember items, such as baggages, galley carts, and other items known in the art. The cabin crew area 10 also includes multiple galley carts 30 that may be stored in a galley cart storage structure 32 within the aft area 16 or in the stairway/storage area 20.

The aft area 16 includes the galley-servicing area 12 that includes the storage structure 32 and a main counter 34, which allows for the performance of galley-servicing tasks thereon. Galley-servicing tasks refer to any task that may be performed by a crewmember within a galley serving area. Galley-servicing tasks may include the preparing and arranging of food and beverages and the documenting, recording, and reporting of data related to passengers, crewmembers, baggage, and stock. Stock refers to items such as food and beverage items, forks, spoons, knives, cups, pillows, blankets, and any other stock items known in the art, as well as safety related items, such as flotation devices, breathing apparatuses, first aid kits, and other safety related items. The galley-servicing tasks may include tasks performed in relation to or for passengers or crewmembers.

The storage structure 32 extends laterally across the aft area 16 between the exterior walls 36 of the aircraft 14, namely a starboard sidewall 38 and a port sidewall 40. The storage structure 32 may also extend in the fore and aft directions between a front section 42 of the aft area 16 and the aft wall 24. Although the storage structure 32, as shown, has a depth $D_1$ that is approximately equal to twice the depth of a galley cart, referred to elsewhere as "double deep", the structure 32 may be of any depth. The depth of a galley cart is designated as $D_2$. In the two-galley cart deep sample embodiment shown the front section 42 refers to the portion of the aft area 16 that contains the first lateral row of galley carts 44. The aft area 16 also includes a rearward section 46 that has a second lateral row of galley carts 48.

The storage structure 32 includes multiple galley storage units 50. The storage structure 32 allows for the storage and alignment of the galley carts 30 in lateral rows in both the forward section 42 and in the rearward section 46. A majority of the storage units 50 include two of the galley carts 30, a first cart in the first row 44 and a second cart in the second row 48. The second cart is stored aft of the first cart. Each storage unit 50 has an access door 52, which resides on the front side 54 of storage structure 32 below the main counter 34. The storage units 50 have any depth and width. Even though a particular number of storage units are shown and each storage unit is shown with the capability of storing a particular number and size of galley and/or stowage carts, the storage structure 32 may be divided into any number of storage units and each storage unit may have any number of galley and/or stowage carts.

The main counter 34 extends laterally across the aft area 16 and galley-servicing area 12 between the exterior walls 36. The main counter 34 may be arched as shown to provide an ergonomically shaped working environment. The main counter 34 is coupled to the top of the storage structure 32 and may be of various depths; an example of which is shown and has a depth designated as $D_3$.

The doorway areas 18 include the rear doors 22 and a pair of doorway counter sections 60 that extend across the interior sides 26. The counter sections 60 are coupled to and extend from the main counter 34 and increase the counter surface working area. The counter sections 60 are coupled to the main counter 34 via a hinge or pivot member 62. The counter sections 62 may rotate up or down or slide in relation to the main counter 34. The counter sections 62 may be stowable, collapsible, foldable, and/or stowed using various techniques known in the art. The counter sections 62 may be of various sizes, shapes, and styles.

A line replaceable structure 64 is coupled to the stowage structure 32 and resides aft of the main counter 34 and above a portion of the galley carts 30, such as the carts 44 and 48. The line replaceable structure 64 encloses a line replaceable unit (LRU) 66. The LRU 66 is shown in the form of a refrigeration unit. The LRU 66 cools the items within the galley carts 30, such as food and beverage items. The LRU 66 is coupled to the galley carts 30 via the ductwork 68, which spans across the galley carts 30. The LRU 66 circulates air to and from the galley carts 44 and 48 to reduce or maintain temperature thereof via the ductwork 68. The air may be circulated over, around, and/or through the galley carts 30. Any number of line replaceable structures and LRUs may be utilized, depending upon the number, size, and coolant requirements of the galley carts 30 or other objects being cooled.

The LRU 66 may be of various types and styles. Some examples of LRUs are a refrigeration unit, a chiller, an air conditioner, a flight control box, a storage box, an electronic box, and a black box. The LRU 66 may be in various locations, such as in an overhead area, an overhead compartment area, in a galley service area between a floor and an overhead compartment, and below a floor.

The stairway/storage area 20 includes a stairway/storage structure 70 that has the stairway 28 with stairway elements 71. The stairway structure 70 also includes the baggage compartment 72 and the temporary galley storage unit 74. The stairway 28 may be utilized to access areas above or below the main deck 76. The stairway 28 may also be utilized to access overhead compartments, such as compartments 78, crew rest areas, storage areas, or other areas known in the art.

The cabin crew area 10 may also include sectioning members 80 that separate a passenger cabin 82 from the galley-servicing area 12. The sectioning members 80 include sectioning walls 84 and curtains 86. The curtains 86 allow for the ingress and egress of crewmembers into and out of the galley-servicing area 12. The sectioning members 80 may be coupled between the exterior walls 36 and the stairway/storage structure 70.

The cabin crew area 10 may also include galley-servicing items and containers 88 stored aft of the main counter 34 and between the galley carts 44 and 48 and an overhead area or compartment within a counter storage structure 90. The servicing items and containers 88 may include ovens, coffee pots, storage containers, beverage racks, and other galley-servicing items and containers known in the art.

Referring now to FIGS. 2A–B and 3A–B, top and side views of a cabin crew area 10' incorporating a crew rest area 92 and top and side views of a cabin crew area 10" also incorporating a crew rest area 92' are shown in accordance with another embodiment of the present invention. The cabin crew areas 10' and 10" are similar to the cabin crew area 10 in that they include a main counter 34', that extends laterally between the exterior walls 36, and a forward lateral row of galley carts 44'. However, the cabin crew areas 10' and 10" also include the crew rest areas 92 and 92', which are located between the galley cart storage structures 94 and the aft wall 24. A separation or opening 96 exists within the main counter 34' to allow for the passage of crewmembers therethrough to access the rest areas 92 and 92'.

The main counter 34' includes a starboard section 98 and a port section 100. The main counter 34' may also include a counter door 102 that may rotate on a horizontally mounted pivot joint 104. The counter door 102 has a closed state and an open state. When in the closed state the counter door 102 is utilized as a part of the main counter 34' for performance of galley tasks. When in the open state, crewmembers are permitted to ingress and egress the rest areas 92 and 92'.

The main counter 34' resides over the galley cart storage structures 94. A first storage structure 106 is located below the starboard section 98. A second storage structure 108 is located below the port section 100.

Figure 2A:
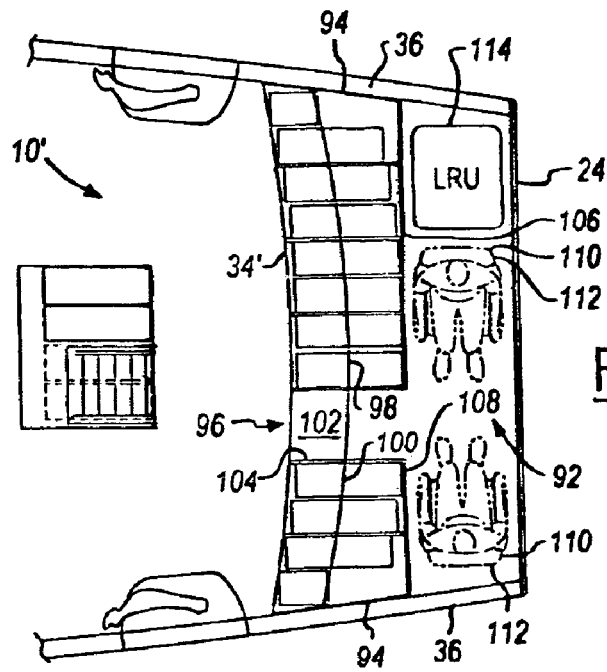
FIG. 2A is a top view of a cabin crew area incorporating a crew rest area in accordance with another embodiment of the present invention.
Figure 2B:
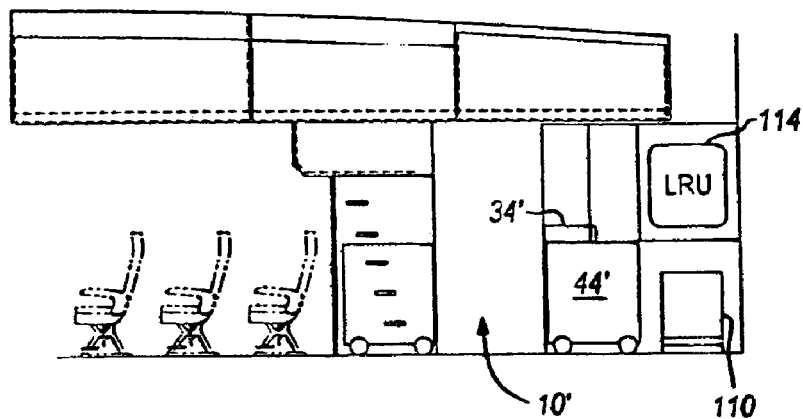
FIG. 2B is a side view of a the cabin crew area of FIG. 2A.
Figure 3A:
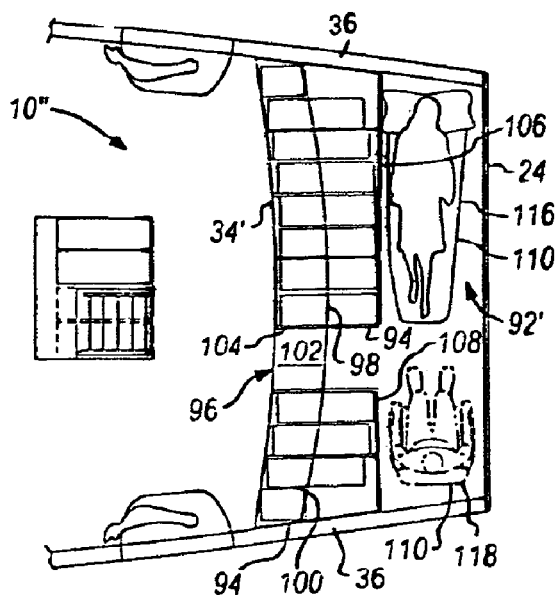
FIG. 3A is a top view of a cabin crew area incorporating a crew rest area having multiple berths in accordance with another embodiment of the present invention.
Figure 3B:
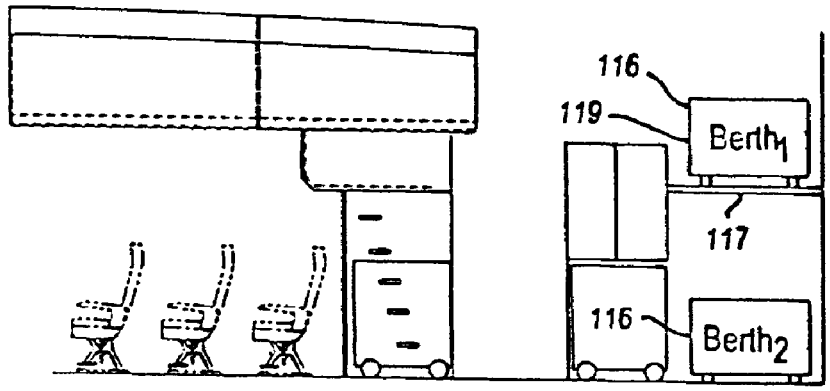
FIG. 3B is a side view of the cabin crew area of FIG. 3A.

The rest area 92 and 92' include the crew rest structures 110. In FIG. 2A, the crew rest structures are shown as a pair of crewmember seats 112. As another example, in FIG. 3B the crew rest structures are shown as two berths 116 stacked one over the other and a crewmember seat 118. The berths 116 may be stacked on each other or a platform 117 may be provided to support the upper berth 119. The rest areas 92 and 92' may include any number of crew rest structures. The rest area 92 includes an LRU 114 mounted above a galley cart level and aft of the galley carts 44'. The rest areas 92 and 92' may include one or more lavatories, although not shown.

Figure 4:
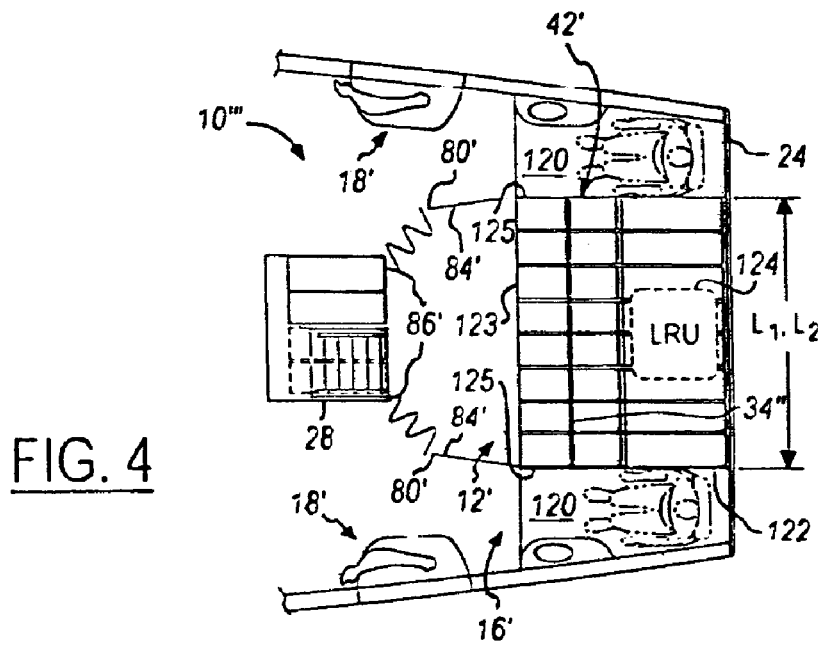
FIG. 4 is a top view of a cabin crew area incorporating lavatories in accordance with still another embodiment of the present invention.

Referring now to FIG. 4, a top view of a cabin crew area 10''' is shown incorporating lavatories 120 in accordance with still another embodiment of the present invention. The cabin crew area 10''' includes an aft area 16' with a galley-servicing area 12' and the two lavatories 120. The galley-servicing area 12' resides between the lavatories 120.

The galley-servicing area 12' includes a main counter 34" that extends laterally across a forward section 42' of the aft area 16' between the lavatories 120. The galley-servicing area 12' also includes a galley cart storage structure 122 that resides below the main counter 34". The storage structure 122 has a lateral length $L_1$ that is approximately the same as the length $L_2$ of the main counter 34". The storage structure 122 extends from the front edge 123 of the main counter 122 to the aft wall 24. The galley cart storage structure 122 also has a two-galley cart depth.

The galley-servicing area 12' may also include an above the counter storage structure (not shown) similar to the above counter structure 90 and have a lateral length that is approximately the same as that of the galley cart storage structure 122. The above counter structure may contain a LRU, as shown by hidden lines 124.

The galley-servicing area 12' is enclosed and separated from the doorway areas 18' via sectioning members 80'. The sectioning members 80' are coupled between a stairway/storage structure 28 and lateral ends 125 of the galley cart storage structure 122. The sectioning members 80', like the sectioning members 80, include sectioning walls 84' and curtains 86'.

Figure 5:
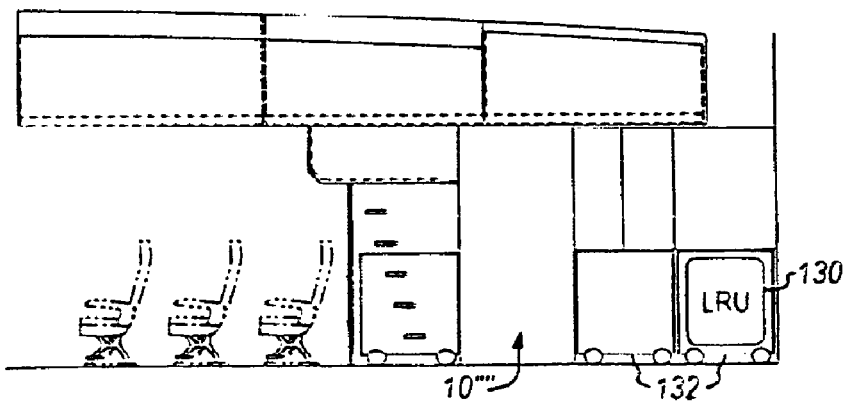
FIG. 5 is a side view of a cabin crew area incorporating a line replaceable unit within a galley-servicing cart volume.

Referring now to FIG. 5, a side view of a cabin crew area 10"" incorporating a LRU 130 within one of the galley-servicing carts 132 is shown. In general, LRUs may be located in various areas of a cabin crew area. In the example embodiment shown, the LRU 130 is located within the internal volumes of the galley carts 132 to provide portability of and to conserve on space occupation by the LRUs exterior to the galley carts 132 and within the cabin crew area 10"". The above LRU configurations in FIGS. 1A–2B and 4–5 are provided as a few examples; other LRU configurations may be utilized.

The present invention provides cabin crew areas and arrangements thereof that provide increased utility and allows for efficient volume utilization thereof. The cabin crew areas minimize crewmember and galley cart interference, provide increased galley cart storage, utilize traditionally under-utilized doorway spaces, provide spaces aft of the galley area, and increase continuous counter working surface area for performance of galley-servicing tasks thereon.

While the invention has been described in connection with one or more embodiments, it is to be understood that the specific mechanisms and techniques which have been described are merely illustrative of the principles of the invention, numerous modifications may be made to the methods and apparatus described without departing from the spirit and scope of the invention as defined by the appended claims.

What is claimed is:

1. A cabin crew area of an aircraft comprising:
   a single level aft area comprising a plurality of galley carts;
   at least one galley storage unit residing in said aft area and storing said plurality of galley carts, said galley storage unit having a fore/aft depth that is approximately equal to the depth of two or more of said plurality of galley carts;
   a main counter residing over said at least one galley storage unit and extending laterally across the cabin crew area of the aircraft, and coupled to and between a starboard wall and a port wall of the aircraft; and
   at least one doorway counter extending at least partially in at least one doorway area and coupled to said main counter.

2. A cabin crew area as in claim 1 further comprising at least one sectioning member separating said aft area from a passenger cabin.

3. A cabin crew area as in claim 1 further comprising at least one line replaceable structure coupled to said at least one galley storage unit.

4. A cabin crew area as in claim 3 wherein said at least one line replaceable unit structure adjusts temperature of said plurality of galley carts.

5. An aircraft having a cabin crew area comprising:
a single level galley-servicing area comprising;
at least one galley storage unit storing a plurality of galley carts and having a fore/aft depth that is approximately equal to the depth of two or more of said plurality of galley carts;
a main counter residing over said galley storage unit, extending laterally across the cabin crew area of the aircraft, and coupled to and between a starboard wall and a port wall of the aircraft;
two doorway counters extending at least partially in two doorway areas,
said two doorway counters are coupled to said main counter,
wherein one of said two doorway counters is substantially located at the extreme port side of said main counter, and wherein the other of said two doorway counters is substantially located at the extreme starboard side of said main counter.

6. An aircraft as in claim 5 wherein said at least one of said two doorway counters is stowable.

7. Aircraft as in claim 5 further comprising a hinge member coupled between said main counter and said at least one of said two doorway counters, at least one of two said doorway counters rotatable about said hinge member.

8. An aircraft as in claim 5 further comprising at least one sectioning member separating a passenger compartment from the galley-servicing area.

9. An aircraft as in claim 8 wherein said sectioning member comprises a curtain.

10. An aircraft as in claim 8 further comprising a stairway, said at least one sectioning member coupled between said stairway and at least one of said starboard wall and said port wall.

11. An aircraft as in claim 5 further comprising a line replaceable structure coupled to said at least one galley storage unit.

12. An aircraft as in claim 11 wherein said line replaceable structure comprises a line replaceable unit that is selected from at least one of a refrigeration unit, a chiller, an air conditioner, a flight control box, a storage box, an electronic box, and a black box.

13. An aircraft as in claim 11 wherein said line replaceable structure resides in one of an overhead area, an overhead compartment area, a galley service area, an area between a floor and an overhead compartment, and an area below a floor.

14. A cabin crew area of an aircraft comprising:
a single level aft area comprising a plurality of galley carts;
at least one galley storage unit residing in said aft area and storing said plurality of galley carts,
said at least one galley storage unit configured for placement of at least a portion of said plurality of galley carts in a lateral row in a forward section of said aft area;
a main counter residing over said at least one galley storage unit and extending laterally across a galley-servicing area of the aircraft;
two doorway counters extending at least partially in two doorway areas,
said two doorway counters are coupled to said main counter,
wherein one of said two doorway counters is substantially located at the extreme port side of said main counter, and wherein the other of said two doorway counters is substantially located at the extreme starboard side of said main counter.

15. A cabin crew area as in claim 14, further comprising a hinge member coupled between said main counter and at least one of said two doorway counters, at least one of said two doorway counters rotatable about said hinge member.

* * * * *